May 20, 1958  J. DE MONTREMY  2,835,178
SHUTTER DEVICES FOR PHOTOGRAPHIC CAMERAS
Filed Sept. 13, 1952  2 Sheets-Sheet 1

INVENTOR
JEAN DE MONTREMY
BY
Haseltine, Lake & Co
AGENTS

United States Patent Office 2,835,178
Patented May 20, 1958

2,835,178

SHUTTER DEVICES FOR PHOTOGRAPHIC CAMERAS

Jean de Montremy, Paris, France

Application September 13, 1952, Serial No. 309,430

Claims priority, application France October 4, 1951

1 Claim. (Cl. 95—58)

The present invention relates to shutter devices for photographic cameras, and in particular small size cameras.

Its chief object is to simplify the construction of these devices and thus to reduce the size of the cameras in which they are mounted.

It consists essentially in constituting the main element of the shutter device by a rotary drum provided with slots parallel to its axis and having its axis at right angles to the axis of the camera lens.

Other features of my invention will become apparent in the course of the following detailed description of some specific embodiments thereof with reference to the accompanying drawings, given merely by way of example, and in which.

Figures 1, 4:
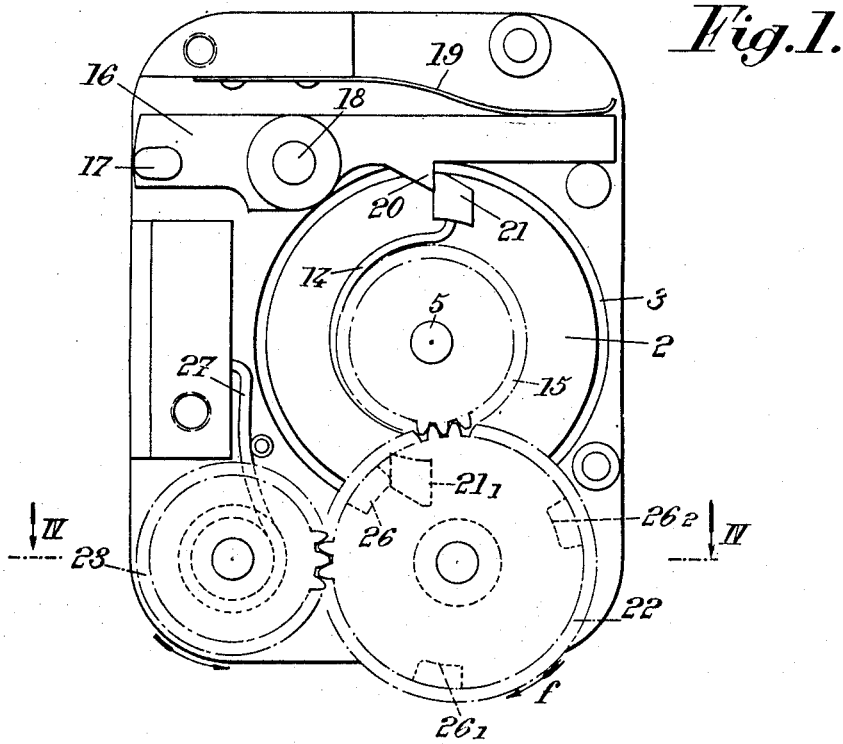
Fig. 1 is an elevational view, with parts removed, of a camera made according to my invention.
Fig. 4 is a sectional view on the line IV—IV of Fig. 1.
Figure 2:
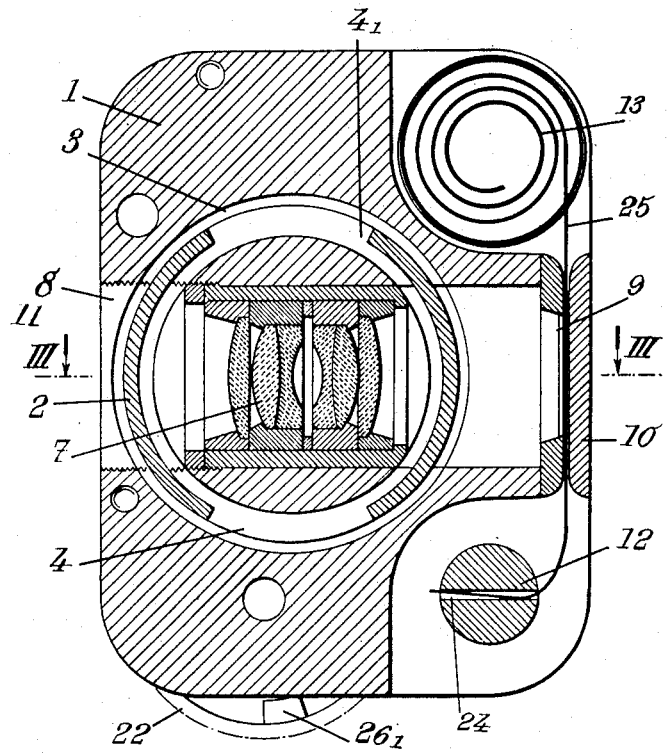
Fig. 2 is a sectional view on the line II—II of Fig. 3.
Figure 3:
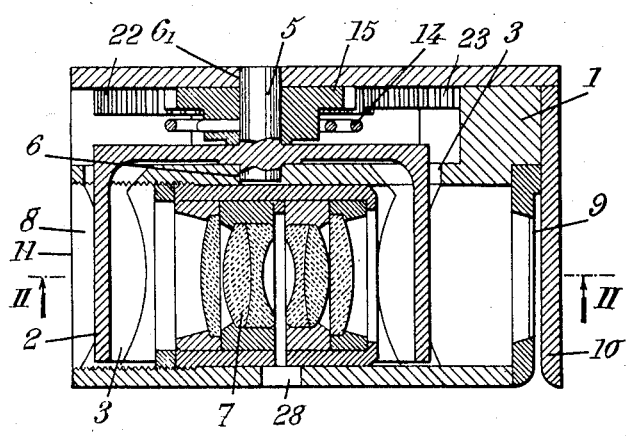
Fig. 3 is a sectional view on the line III—III of Fig. 2.

The camera shown by the drawings includes the following elements:

(a) A frame or casing 1;

(b) A shutter constituted by a drum 2 the active portion of which is rotatable in a circular housing 3 of said casing 1, this drum being provided with two ports or slots 4 and $4_1$ disposed at 180° from each other. Drum 2 is journalled, through its trunnion 5, in bearings 6 and $6_1$;

(c) A lens 7 engaged in a passage 8, preferably circular, so that the lens axis is at right angles to the axis of drum 2;

(d) A device for driving the photographic film behind a window 9 (cooperating with a film pressing member 10) located behind lens 7, i. e. on the other side of said lens from the aperture 11 through which the incident rays strike the lens. The film driving device includes, in the usual way, two rods or magazines 12 and 13, driven as it will be hereinafter explained;

(e) A drum setting device, advantageously arranged so that said drum rotates always in the same direction, including elastic means constituted by a spring 14 spiral wound about the axis of the drum in such manner that one end of this spring bears against the drum and the other end against a winding member 15;

(f) A shutter release device arranged so that the drum, once released, rotates through 180°, this device including in particular a release lever 16, manually actuated at 17 and pivoted about an axis 18, against the action of a spring 19, this lever being provided with a projection 20 adapted to cooperate with either of two projections 21, $21_1$ rigid with drum 2 and located thereon at 180° to each other; and (g) Means for winding up the spring and simultaneously moving the film forward by means of a single control member.

This control member is constituted by a pinion 22 operable from the outside and meshing on the one hand with the winding up pinion 15, and on the other hand with another pinion 23 rigid with the rod 12 (slotted at 24) which serves to drive film 25. The ratio of the numbers of teeth of pinions 22 and 15 is such that the first one rotates through one third of a revolution while the other rotates through one half of a revolution, pinion 22 being provided with three abutments 26, $26_1$ and $26_2$, disposed at 120° to each other and adapted to cooperate with projections 21, $21_1$.

Furthermore, means are provided for enabling the parts to rotate in only one direction, indicated by arrow $f$ (Fig. 1) for pinion 22, said means being constituted for instance by a brake spring 27 mounted on the axis of pinion 23.

This camera works as follows:

To wind up the shutter and move the film, pinion 22 is rotated through one third of a revolution, after which this pinion is stopped by its abutment coming into contact with projection $21_1$.

The film being thus brought in position and spring 14 being tensioned, shutter release is obtained by depressing lever 16 at 17.

Drum 2 rotates through an angle of about 153° until projection 21 comes into contact with abutment 26.

In the course of this rotation of drum 2, the picture is taken since both of the windows 4 and $4_1$ have simultaneously passed in line with the lens 7, respectively at the front and at the rear thereof.

Control pinion 22 is now released and can be again rotated through 120° for the taking of the next picture. This movement enables projection $21_1$ and drum 2 to rotate through 27° in addition to the 153° through which they have already rotated. The drum thus comes into the position where projection $21_1$ is applied against the projection 20 of lever 16. The cycle of operation is now completed and the film ready to receive a new picture.

Any mistake in handling such a camera is impossible. Pinion 22 cannot be rotated in the direction opposed to that of arrow $f$, due to the presence of brake spring 27. On the other hand, if the shutter is not released, pinion 22 is locked in the position it occupies by the system of abutments 20—21 and 26—$26_1$ as above explained.

In the case of very small apparatus, it is impossible to house an iris diaphragm in the lens system because the focal length is too short. I may then provide a slot such as 28 to introduce movable diaphragms.

The device above described is very simple and can therefore be adapted to photographic cameras of extremely small size.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

For use in a photographic camera including a casing and a lens mounted in said casing, a shutter device which comprises, in combination, a shutter drum rotatable in said casing about an axis at right angles to the axis of said lens, said drum surrounding said lens and being provided with at least two apertures in the form of slots parallel to the axis thereof, a drum setting pinion journalled in said casing coaxially with said drum, spring means for resiliently coupling said drum with said pinion, said drum carrying, fixed to the peripheral portion thereof, two projections diametrically opposed to each other, a release member including a stop abutment for cooperating with either of said projections, said member being movable in said casing and operable from the outside thereof to retract said abutment from the path of said projections, a winding up pinion journalled in said casing and in mesh with said drum setting pinion, the ratio of the number of teeth of said winding up pinion to the number of teeth of said drum setting pinion being equal to 3/2, a portion of the periphery of said winding up pinion projecting from said casing so that it can be rotated from the outside thereof, means mounted in said casing for preventing rotation of said winding up pinion in one direction, and three identical abutments carried by said winding up pinion along respective radii thereof at 120° to one another, said last mentioned abutments being located on one flat circular face of said winding up pinion and having each one outer circumferential edge and two edges transverse to said circumferential edge the radius of said circumferential edge and the distance between said edges being sufficient to enable said abutments to cooperate with said projections so that the position in which one of said winding up pinion abutments is stopped by contact with one face of one of said projections when the other face of the other of said projections is itself stopped by contact with said release member stop abutment is such that said winding up pinion abutment will stop said second mentioned projection after it has been released by retraction of said release member stop abutment and has rotated through an angle slightly smaller than 180°.

References Cited in the file of this patent

UNITED STATES PATENTS

| | | |
|---|---|---|
| 526,471 | Waters | Sept. 25, 1894 |
| 1,106,069 | Anderson | Aug. 4, 1914 |
| 1,690,292 | Grosso | Nov. 6, 1928 |
| 2,226,161 | Drotning | Dec. 24, 1940 |
| 2,226,245 | Kende | Dec. 24, 1940 |
| 2,335,439 | Nerwin | Nov. 30, 1943 |
| 2,338,657 | Mihalyi | Jan. 4, 1944 |

FOREIGN PATENTS

| | | |
|---|---|---|
| 664,828 | Great Britain | July 29, 1948 |